Patented May 14, 1935

2,001,299

UNITED STATES PATENT OFFICE 2,001,299

MANUFACTURE OF COPPER AMMONIUM SALTS OF DIAZO AMINO TETRAZOLE

Willi Brün, Bridgeport, Conn., assignor to Remington Arms Company, Inc., a corporation of Delaware No Drawing. Application December 14, 1932,
Serial No. 647,220

7 Claims. (Cl. 260—12)

This invention relates to the production of salts of the derivatives of tetrazoles, and will be described with particular reference to the production of the copper ammonium salt of diazo amino tetrazole.

Diazo amino tetrazole has the composition $C_2N_{11}H_3$, and the structure

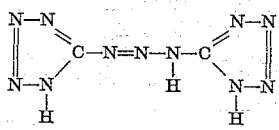

It reacts with ammonia and a cupric salt, such as cupric acetate or cupric sulphate, to form a copper ammonium salt having the composition $$C_4N_{22}Cu_3 + 2NH_3,$$

and the probable structure

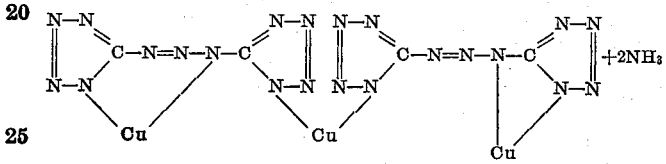

The present invention contemplates an improved method for the production of this copper ammonium salt, an illustration of which method is as follows:

1. Into a solution of the proportions of 1.2 grams of the primary sodium salt of diazo amino tetrazole and 10 c. c. of normal sodium hydroxide in 100 c. c. of water, there is dropped slowly a solution of the proportions of 5 grams of a cupric salt, such as cupric acetate, in 50 c. c. of water, the solution being constantly agitated. The reaction, which is permitted to take place at room temperature, results in an amorphous precipitate which is so finely divided that it settles appreciably only after standing for several hours.

2. The suspension resulting from the foregoing procedure is nearly neutral in character. It is tested for acidity, and rendered slightly acid, if necessary, with a non-mineral acid, such as glacial acetic acid; after which, 1 c. c. of such acid is added. The presence of this acid appears to be necessary to the securing of a crystalline copper ammonium salt. It may cause an intermediate reaction which produces an ammonium salt, but this has not been definitely ascertained.

3. To the material resulting from operations 1 and 2, as above outlined, there is added drop by drop about 35 to 50 c. c. of concentrated ammonia. This results in the precipitation of square or rhombic dark green crystals of a substantially pure copper ammonium salt of diazo amino tetrazole.

It will be noted that there is used an excess of the cupric salt, and a measured excess of ammonia. The use of an excess of the cupric salt appears to be necessary to the production of the copper salt, and the necessity for the use of a proper excess of ammonia may be due to the presence of the excess of the cupric salt. A deficiency of ammonia results in a useless amorphous precipitate, while too great an excess of ammonia produces an impurity in the form of needle crystals of a very light green color. The composition of these crystals has not been ascertained but they are known to be non-explosive and their presence in the explosive copper ammonium salt is undesirable. Similar needle crystals are formed along with the copper ammonium crystals if the latter are permitted to remain too long in the solution; and in the filtrate after the removal of the copper ammonium salt crystals. They are also secured if the ammonia in the third operation above outlined is added too rapidly. It is thought that they may be crystals of another copper ammonium salt containing more ammonia, but this has not been definitely ascertained.

It will be noted that the process heretofore described is a continuous one, the only precipitate removed from the reacting fluids being a copper ammonium salt of high purity and well adapted for use as an explosive. Prior methods are wholly unsuitable for practice on a commercial scale. They have involved the removal and treatment of the amorphous copper salt resulting from operation "1" as given above. Said precipitate is a fine sludge which clogs a filtering element and renders filtering extremely slow. The recovery of a few grams of the copper salt is a matter of several hours. Further, it has hitherto been considered necessary to wash the copper salt thus recovered with acidulated water, thereby altering its character, all in preparation for the reaction with ammonia. The process herein disclosed eliminates these slow and impracticable operations, and is believed to constitute the first disclosure of a commercially workable method for the manufacture of the copper ammonium salt.

A variation in the process which is within the purview of the invention comprises the use of ammonium acetate in place of ammonia and acetic acid, the procedure remaining essentially the same. A good yield of rhombic crystals of the copper ammonium salt is secured, the crystals tending to smaller size than those secured by the use of ammonia and acetic acid.

While the process has been described with particular reference to the copper ammonium salt of diazo amino tetrazole, it is obviously applicable to the preparation of other salts of this and other tetrazoles, and the appended claims are to be broadly construed.

What is claimed is:

1. In the manufacture of a copper ammonium salt of diazo amino tetrazole by the reaction upon a soluble salt of diazo amino tetrazole of first a solution of a cupric salt and second acetic acid and ammonia, the method which comprises the addition of the ammonia dropwise until a measured excess is present, thereby securing a precipitate of the substantially pure crystalline copper ammonium salt and preventing the precipitation of undesirable impurities.

2. In the manufacture of a crystalline copper ammonium salt of diazo amino tetrazole, the method which comprises the addition of acetic acid and ammonia to the fluid suspension resulting from the addition of a cupric salt to a solution of a soluble salt of diazo amino tetrazole.

3. In the manufacture of a copper ammonium salt of diazo amino tetrazole, the method which comprises the addition of ammonia to the fluid suspension resulting from the addition of a cupric salt to a solution of a soluble salt of diazo amino tetrazole.

4. In the manufacture of a copper ammonium salt of diazo amino tetrazole, the method which comprises the addition of a material selected from the group consisting of ammonia and ammonium acetate to a fluid suspension resulting from the admixture of a soluble salt of diazo amino tetrazole and a cupric salt.

5. In the manufacture of a copper ammonium salt of diazo amino tetrazole by the reaction upon a soluble salt of diazo amino tetrazole of first a solution of a cupric salt and second acetic acid and ammonia, the method which comprises the treatment of the precipitated copper salt with acetic acid while it is suspended in the fluid from which it is precipitated.

6. In the manufacture of a copper ammonium salt of diazo amino tetrazole, the method which comprises the precipitation of the cupric salt of diazo amino tetrazole, and the addition of ammonium acetate to a suspension of said cupric salt.

7. In the manufacture of a copper ammonium salt of diazo amino tetrazole, the method which comprises the addition of ammonium acetate to a fluid suspension resulting from the admixture of a soluble salt of diazo amino tetrazole and a cupric salt.

WILLI BRÜN.